United States Patent Office 3,558,288
Patented Jan. 26, 1971

3,558,288
EXTRACTION OF METAL IONS FROM ACIDIC AQUEOUS SOLUTION USING AN AMINE AND A CARBOXYLIC ACID
Raymond C. Burrows, Minneapolis, Minn., assignor to Ashland Oil & Refining Company, Ashland, Ky., a corporation of Kentucky
No Drawing. Filed Apr. 15, 1965, Ser. No. 448,276
Int. Cl. B01d 11/04
U.S. Cl. 23—312  4 Claims

ABSTRACT OF THE DISCLOSURE

Aqueous solutions of a variety of heavy metal cations, particularly exemplary of which is copper, are extracted by contact with an immiscible hydrocarbon having dissolved therein an amine and a monocarboxylic acid to provide a hydrocarbon phase containing the extracted metal values in the form of readily decomposable complexes thereof.

METHOD FOR THE EXTRACTION OF METAL IONS FROM SOLUTION

The present invention relates to an improved process for the extraction of metal ions from aqueous solutions and more particularly to an improved process for the extraction of metal ions employing a combination of complexing agents capable of solubilizing metal ions in an organic solvent which is water immiscible.

The extraction of metal ions using amine complexing agents is well known in the art. The disadvantage of using such complexing agents is the limited solubility of the complexed metal ion in the organic phase, the tendency of the amine to cause emulsification of the organic phase in the aqueous phase and the stability of the amine complex, which increases the difficulty of recovering the metal ion from the organic phase on separation.

It is therefore an object of the present invention to provide an improved metal extraction process for aqueous solutions of metal ions.

It is another object of the present invention to provide an improved metal ion extraction process employing amines.

It is a further object of the present invention to provide a metal ion extraction process employing a combination of complexing agents.

Other objects will become apparent from the following description and claims.

The extraction of metal ions in accordance with the present invention is accomplished by a process which comprises extracting an aqueous solution of a metal ion having a pH of greater than one with an immiscible organic solvent having dissolved therein a water insoluble amine and a water insoluble carboxylic acid, thereafter separating the organic and aqueous phases and recovering the metal from the organic phase. The term "water insoluble" as used herein is intended to define amines and acids which have a water solubility of less than one weight per cent at the extraction conditions.

The extraction process of the present invention is based on the discovery that the acid and amine form a neutral complex with the metal ion, which complex exhibits greater solubility in organic solvents than the charged complex obtained solely from the use of amines, and which neutral complex decomposes more readily than the charged amine complex, thus permitting a better recovery of the metal ion.

The extraction process of the present invention is particularly useful in the extraction of copper ions although ions of other transition metals such as cobalt, nickel, chromium, manganese, molybdenum, uranium, and the precious metals such as palladium, platinum and silver can similarly be extracted. Suitable metal ion solutions include acidic aqueous solutions obtained from the leaching of ores and from industrial waste solutions containing the metal ions in concentrations to low to economically employ other methods of recovery. The efficiency of the extraction process of the present invention increases with decreasing acidity. Strong acidic solutions at a pH below one cannot be advantageously extracted and generally it is preferred to employ acidic solutions having a pH of two and higher. The upper limit of the pH will differ with the metal ion extracted and depends on the formation of insoluble oxides. In the extraction of copper ions a pH above five is generally not desirable.

The water insoluble amines employed in the extraction process of the present invention are amines which contain an aliphatic hydrocarbon radical of sufficient carbon atoms to impart water insolubility to the amine. Primary, secondary, and tertiary amines can be employed. The amine can be a monoamine or a polyamine. Examples of the latter include N-alkyl-1,3-propylene diamine, N,N'-dialkyl-1,3-propylene diamine, N-alkyl-tetramethylene diamine, and N-alkyl-hexamethylene diamine, wherein the alkyl groups have from 6 to 28 carbon atoms. The term aliphatic hydrocarbon radical is intended to include aryl substituted aliphatic radicals since such substitution does not affect the operability of the amine in the process of the present invention nor does such substitution substantially affect the aliphatic character of the radical. The preferred amines have the general formula:

wherein R is an aliphatic hydrocarbon radical of 6 to 28 carbon atoms and R' is a radical selected from the class consisiting of hydrogen and monovalent hydrocarbon radicals of 1 to 28 carbon atoms. Examples of such amines are hexylamine, octylamine, stearylamine, behenylamine, phenylstearylamine, oleylamine, myristylamine, lauryl amine, arachidylamine, erucylamine, hexadecylamine, linoleylamine, linolenylamine, eleostearylamine, ricinoleylamine, palmitoleylamine, petroselenylamine, N-methyl stearylamine, N-butyl stearylamine, distearylamine and the like. Mixtures of such amines can be employed.

The water insoluble acids employed in the process of the present invention are preferably carboxylic acids which contain an aliphatic radical of sufficient carbon atoms to impart water insolubility. The carboxylic acid can be a monocarboxylic acid or a polycarboxylic acid. Examples of the latter include alkyl substituted malonic acids and alkyl substituted glutaric acids wherein the alkyl groups have from 6 to 18 carbon atoms. As in the case of the amines, the aliphatic hydrocarbon radical may be aryl substituted. The preferred acids are aliphatic monocarboxylic acids of 6 to 28 carbon atoms such as hexanoic acid, octanoic acid, oleic acid, stearic acid, phenylstearic acid, lauric acid, linoleic acid, myristic acid, palmitic acid, erucic acid, linolenic acid, eleostearic acid, ricinoleic acid, palmitoleic acid, petroselenic acid, and the like. Mixtures of such acids can be employed.

The amines and acids employed in the present invention need not be pure and commercial mixtures containing such amines and such acids can be employed.

The ratio of the amine complexing agent to the acid complexing agent can vary considerably but is generally maintained within an amine-to-acid mole ratio of 10:1 to 1:10, and preferably the acid and the amine are employed in substantially equimolar proportions. Although some of the acid and the amine may form a salt by transfer of a proton from the acid to the amine, such salt formation does not affect the extraction process of the present invention and in fact such salts can be employed in place of equimolar mixtures of the amine and the acid. The quantity of the amine and acid complexing agents employed in the extraction depends on the concentration of the metal ion in the aqueous phase and the number of moles of acid and amine required to form the desired complex with a gram equivalent of the metal ion. Optimum concentrations will vary with the nature of the metal ion and the aqueous solution from which the metal ion is extracted but are readily established experimentally. In general the concentration of the acid and the amine should each be from 0.1 to 100 and preferably from 2 to 10 moles per gram equivalent of the metal ion. Although some further slight improvement in the efficiency of the extraction can be accomplished by still higher ratios of either the acid or the amine to the metal ion, such is not economically attractive. It is to be understood, however, that the ratios of either the amine or the acid to the metal ion can be lower than the indicated minimum ratios without affecting the operability of the process although optimum extraction may not be accomplished.

The amine and the acid complexing agents are employed in the form of a solution in an organic solvent. Any organic solvent capable of dissolving the acid and the amine in sufficient concentration and which solvent is immiscible with water can be suitably employed. The preferred solvents are aliphatic hydrocarbons, aromatic hydrocarbons, and halogenated hydrocarbons. Examples of suitable solvents are benzene, toluene, xylene, bromobenzene, kerosene, cyclohexane, heptane, trichloroethylene, carbon tetrachloride, and the like. The quantity of solvent employed in the extraction is generally determined by economical factors since the efficiency of the extraction increases with increasing volume of organic solvent employed, while the handling of increasing amounts of solvent increases the cost of the extraction. The volume of solvent employed will generally be at least half the volume of the aqueous phase employed. It is to be pointed out, however, that some extraction occurs at very small volumes of organic solvent and that hence the volume of solvent does not affect the operability of the process.

Since the amines have a tendency to stabilize the emulsion formed as a result of the mixing required in the extraction, it is generally preferred to add a de-emulsifier to the organic phase. Aliphatic alcohols of 5 to 14 carbon atoms are suitable de-emulsifiers. Examples of such de-emulsifiers are isoamyl alcohol, n-octanol, 3,3,5-trimethylcyclohexanol, isodecyl alcohol, 2,6,8-trimethylnonanol-4 and the like.

The extraction employing the combination of the amine and acid complexing agents is generally carried out in equipment heretofore employed in the extraction of metal ions employing organic solvent solutions of amines. It is as a matter of fact one of the commercial advantages of the extraction process of the present invention that it can be suitably carried out employing the equipment and methods developed for metal ion extraction employing amines. Preferably the process is carried out using systems involving multiple stage extraction and stripping based on counter-current flow. In some instances it will be desirable to extract the metal ion at elevated temperatures, e.g., 30° to 60° C., to increase the solubility of the amine, the acid, and the complex in the organic phase. The metal is recovered from the organic phase by treatment with concentrated mineral acid which causes the complex of the metal ion formed with the acid and the amine to dissociate back to the metal ion, the acid, and the amine. The organic solvent solution of the regenerated acid and amine can then be recycled.

The effectiveness of the combination of amines and acids to extract cupric metal ions is further illustrated in the following examples.

EXAMPLE I

To 10 parts by volume of a 0.01 molar solution of cupric nitrate was added 10 parts by volume of toluene having dissolved therein 5 moles of a distilled mixture of arachidyl amine and behenylamine, commercially available as "Adogen 101–D," per gram equivalent of copper and 5 moles of undecylic acid per gram equivalent of copper. The mixture was agitated at room temperature for 30 seconds. The organic phase of the mixture was found to assume a strong blue color. The mixture was centrifuged and the phases were separated. The distribution coefficient, showing the ratio of copper in the aqueous phase to the copper in the organic phase, was measured and determined to be 1.05. Use of 10 moles of the amine per gram equivalent of copper without the acid resulted in a very light blue organic phase showing the substantially reduced extraction obtained with just the amine.

EXAMPLE II

The procedure of Example I was repeated employing 5 moles of behenylamine per gram equivalent of copper, and 5 moles of coconut fatty acid per gram equivalent of copper. A strong blue organic phase was obtained. The distribution coefficient was found to be the same as in the complexing agent combination of Example I. Employing 10 moles of the amine per gram equivalent of copper without the acid resulted in substantially reduced extraction.

EXAMPLE III

Employing the procedure of Example I, a 0.03 molar solution of cupric nitrate, acidified to a pH of 2 with nitric acid, was extracted with toluene containing 5 moles of stearylamine per gram equivalent of copper, and 5 moles of coconut fatty acid per gram equivalent of copper. A higher degree of extraction was obtained at amine-to-acid mole ratios of 1:1 than at amine-to-acid mole ratios of 3:1 and 1:3.

EXAMPLE IV

Employing the procedure of Example I, a 0.031 molar cupric sulfate solution acidified to a pH of 2 with sulfuric acid, was extracted with kerosene containing 3 moles of phenylstearylamine per gram equivalent of copper, and 1 mole of phenylstearic acid per gram equivalent of copper. A strong blue-green organic phase was obtained. The distribution coefficient was similar to that obtained in Example I. The use of 4 moles of the amine per gram equivalent of copper without the acid resulted in substantially reduced extraction.

EXAMPLE V

Employing the procedure of Example I, a 0.031 molar cupric sulfate solution, acidified to a pH of 2 with sulfuric acid, was extracted with 20 parts by volume of toluene containing 3 moles of behenylamine per gram equivalent of copper and 1 mole of lauric acid per gram equivalent of copper. The use of 4 moles of the behenylamine per gram equivalent of copper without the acid resulted in substantially reduced extraction.

EXAMPLE VI

Employing the procedure of Example I, a 0.031 molar cupric sulfate solution, acidified to a pH of 2 with sulfuric acid, was extracted with 20 parts by volume of trichloroethylene containing 3 moles of behenylamine per gram equivalent of copper and 1 mole of phenylstearic acid per gram equivalent of copper. The use of 4 moles of behenylamine per gram equivalent of copper resulted in substantially reduced extraction.

The foregoing examples have illustrated the extraction of copper using various amines and acids within the scope of the present invention. Similar results are obtained when these combinations are employed in the extraction of metals other than copper but included within the foregoing description, such as aqueous solutions of nickel sulfate, cobalt nitrate, chromium nitrate, uranyl sulfate, palladium chloride, and platinum sulfate.

The process of the present invention is of particular advantage in metal extraction processes which have heretofore employed an amine as complexing agent.

While the present invention has been described in detail with respect to certain embodiments, it will be apparent that variations and modifications may be made without departing from the scope of the present invention as defined in the appended claims.

What is claimed is:

1. In a process for the solvent extraction of a metal ion selected from the group consisting of copper, cobalt, nickel, chromium, manganese, molybdenum, uranium, palladium, platinum and silver, from an acidic aqueous solution thereof having a pH of greater than 1; the improvement of extracting said metal ion from said solution with an immiscible organic solvent having dissolved therein a water-insoluble amine and a water-insoluble carboxylic acid, said water-insoluble amine having the formula:

wherein R is an alkyl group having from 6–28 carbon atoms and $R^1$ is hydrogen or an alkyl group having from 1–28 carbon atoms and said water-insoluble carboxylic acid being an aliphatic monocarboxylic acid having from 6–28 carbon atoms.

2. The improvement in accordance with claim 1 wherein said amine is a primary amine having from 6–28 carbon atoms.

3. The improvement in accordance with claim 1 wherein the mole ratio of said amine to acid is maintained from 10:1 to 1:10 and the pH of the aqueous phase is greater than 2.

4. The improvement in accordance with claim 1 wherein said metal ion is a copper ion.

References Cited
UNITED STATES PATENTS

| | | | |
|---|---|---|---|
| 3,197,274 | 7/1965 | White | 23—312X |
| 3,278,277 | 10/1966 | Goren | 23—312X |

NORMAN YUDKOFF, Primary Examiner

S. J. EMERY, Assistant Examiner

U.S. Cl. X.R.

23—102, 125, 339, 340; 75—117